Figure 1:
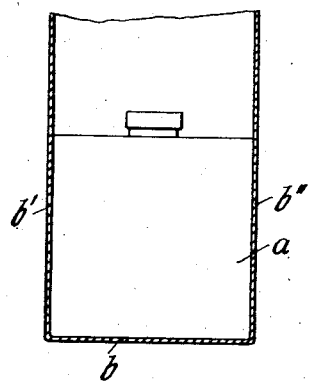

Jan. 31, 1933. C. DORNIER 1,895,976

STORAGE OF LIQUIDS IN AIRCRAFT

Filed May 6, 1931

Inventor:
Claude Dornier
by
Att.

Patented Jan. 31, 1933

1,895,976

UNITED STATES PATENT OFFICE

CLAUDE DORNIER, OF FRIEDRICHSHAFEN-ON-THE-BODENSEE, GERMANY, ASSIGNOR OF ONE-HALF TO DORNIER-METALLBAUTEN G. M. B. H., OF FRIEDRICHSHAFEN-ON-THE-BODENSEE, GERMANY

STORAGE OF LIQUIDS IN AIRCRAFT

Application filed May 6, 1931, Serial No. 535,314, and in Germany July 26, 1930.

My invention relates to the storing of fuel, oil and other liquids in aircraft, and more particularly in the floats of hydroplanes.

It is an object of my invention to improve the storage of such liquids in aircraft and more especially in the floats. To this end I store the liquids in containers having flexible walls deformable under the pressure of the liquid therein, consisting for instance of liquid-tight fabric, cellulosic material, thin sheet metal or the like.

If desired, the containers may be embedded in resilient material which may also be inserted between the containers themselves and the walls of the float or other structure supporting them.

In the drawing affixed to this specification and forming part several embodiments of my invention are illustrated diagrammatically by way of example.

In the drawing

Figure 2:
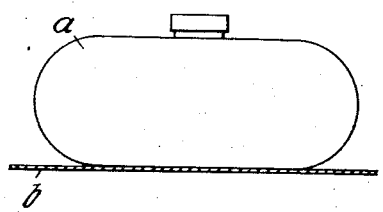
Figure 3:
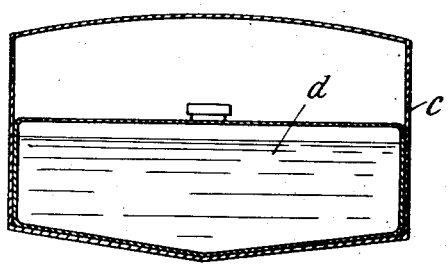
Figure 4:
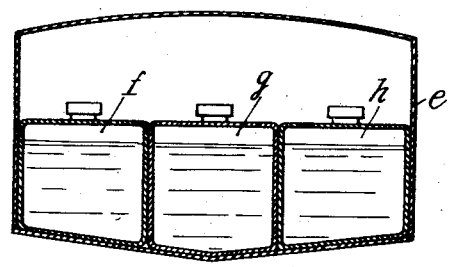
Figure 5:
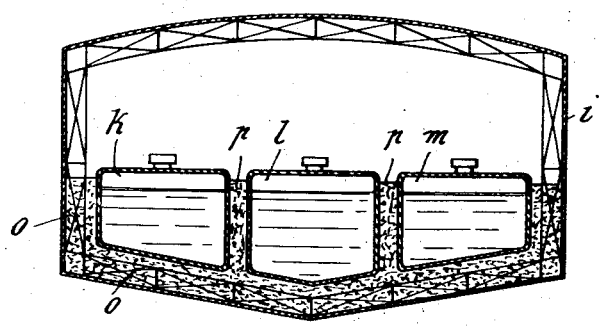

Fig. 1 is an elevation of a deformable container according to my invention accommodated between rigid walls, while Fig. 2 shows the same tank unsupported save at the bottom, Fig. 3 is a cross section of an aircraft float with a single container, and Fig. 4 is a similar view of a float with three deformable containers accommodated therein, Fig. 5 is a similar view showing elastic material arranged between the containers themselves and between these and the walls of the float.

Referring to the drawing, and first to Figs. 1 and 2, $a$ is a container, filled with a liquid, formed of a flexible or deformable material, $b$ is the bottom of a float, or other closed-in space, on which the container is supported, and $b'$, $b''$ are side walls of the float or the like. Fig. 2 shows the deformation of the container, when unsupported, under the weight of the liquid.

In Fig. 3 a single deformable container $d$ is inserted in a float $c$, the container walls being applied against the walls and bottom of the float.

In Fig. 4, $f$, $g$, $h$ are three deformable containers accommodated in a float $e$, the inner walls of the two outer containers being applied against the two walls of the central container, the other walls adapting themselves to the section of the float.

In Fig. 5 $i$ is a float braced on the inside by lattice-work frames $q$ which do not present flat wall surfaces to the three containers $k$, $l$ and $m$, so that a lining $o$ has to be inserted at the bottom and at the side walls of the float for the reception of the containers, similar liners $p$ being inserted between the containers themselves, the elastic liners $o$ and $p$ distribute the pressure of the liquid and transmit it to the structure of the float $i$ and to the containers themselves.

The term "float" as used in this specification and in the claims appended thereto is intended to include every kind of floating body connected with aircraft, such as for instance the hulls of flying boats.

I wish it to be understood that I do not desire to be limited to the exact details of construction shown and described for obvious modifications will occur to a person skilled in the art.

In the claim affixed to this specification no selection of any particular modification of the invention is intended to the exclusion of other modifications thereof and the right to subsequently make claim to any modification not covered by this claim is expressly reserved.

I claim:

In air craft in combination, a float chamber, elastic material partly filling said chamber, said elastic material being formed with a cavity, a deformable liquid container accommodated in said cavity and a body of liquid in said container, said container under the weight of the liquid therein being deformed to apply itself to the bottom and walls of said cavity.

In testimony whereof I affix my signature.

CLAUDE DORNIER.